UNITED STATES PATENT OFFICE.

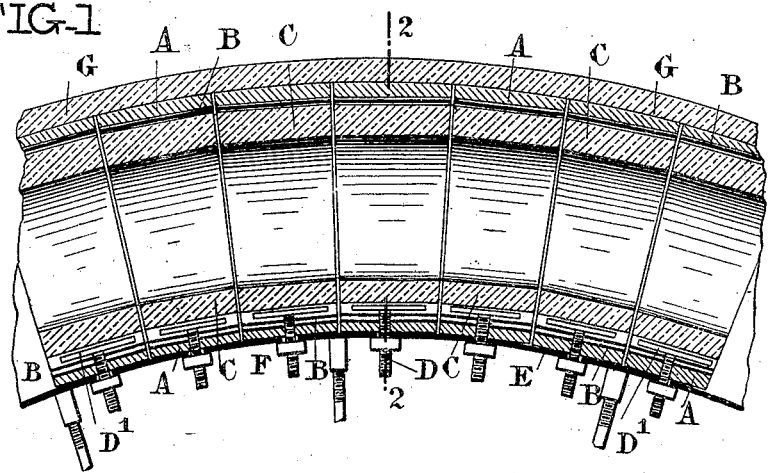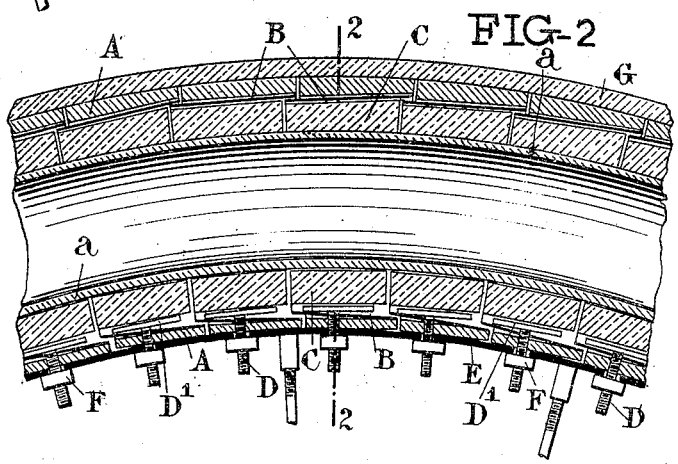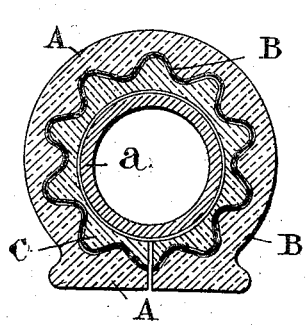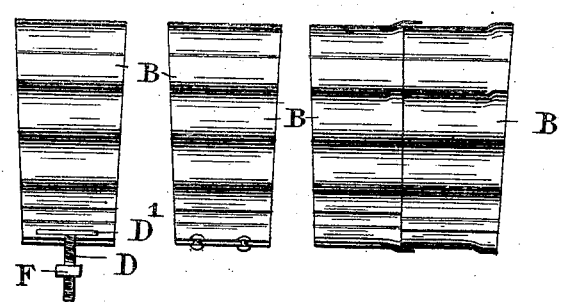

MATHIEU BRUN, OF LYON, FRANCE.

ELASTIC TIRE.

No. 877,471.　　　Specification of Letters Patent.　　　Patented Jan. 21, 1908.

Application filed September 27, 1906. Serial No. 336,430.

*To all whom it may concern:*

Be it known that I, MATHIEU BRUN, a citizen of the French Republic, residing at Lyon, in France, have invented certain new and useful Improvements in Elastic Tires, of which the following is a specification.

The present invention relates to improvements in elastic tires and its object is to provide a construction comprising a series of improved flexible and resilient elements surrounded or inclosed by a continuous insulating tire, the nature of these elements being such that the elasticity thereof is felt only under determined pressures.

In the annexed drawing Figure 1 is a longitudinal section of a portion of a tire and not comprising an air chamber. Fig. 2 is a similar view to Fig. 1 but showing an air chamber inserted. Figs. 3, 4 and 5 show different methods of connecting or assembling the corrugated steel collars hereinafter referred to, and Fig. 6 is a cross-section of another form of tire constructed according to this invention.

Each protective element, of circular, elliptical or any other cross-section comprises an externally smooth and internally corrugated collar A of rubber, cork, leather or any other suitable elastic material adapted to become distorted only under pressure. The shape, number and dimensions of the corrugations are proportional to the degree of elasticity desired according to the application of the tire. Within said corrugated collars, others B of the same corrugated form but of elastic steel are located and again, within the collars B still further externally corrugated and interior smooth collars C of rubber cork or other flexible material are placed.

The collars A and C are each preferably made in a single piece, but the collars B may be formed by a corrugated blade or plate the ends of which are connected by soldering before hardening; or riveted as in Fig. 4, or preferably connected by a screw D (Fig. 3) the flat and extended head D¹ of which bears on the collar along its entire width and holds same in a similar manner as if the ends were riveted. The screw traverses the outer collar A and wheel rim E the element being secured by means of a nut F.

The various elements are preferably somewhat larger at their outer side than at their inner side (Figs. 3 and 4) in order that they may be exactly juxtaposed. The elements are surrounded by or inclosed in a cover G which prevents dirt and dust from penetrating to the interior.

In place of using a series of juxtaposed collars A the outer rubber corrugated cover may be formed in a single piece extending around the whole circumference of the tire or wheel, in which case said cover would be given the usual form of inclosing or outer cover as shown in Fig. 6, and the cover G might be dispensed with.

The various inner rubber collars C could also be made of a single circumferential piece, in which case in order to adapt the steel collars B thereto it is necessary to make the corrugations of the latter collars somewhat larger than those of the rubber elements, so that they may be exactly juxtaposed mechanically after being put in place.

The object of the corrugation of the collars is as follows: Firstly, for increasing the resistance of the steel elements imparting thereto the desired elasticity and also giving to the whole the required circumferential form; and secondly for filling the spaces on the element of rubber or other elastic material both interiorly and exteriorly, left by the corrugations in the steel elements so that when pressure takes place the rubber cork or the like compressed within said spaces offers sufficient resistance to compression. On cessation of the latter the rubber or the like expands and reassumes its original form and position. The corrugations in the rubber elements are also for purpose of avoiding to as great an extent as possible the distortions liable to be produced under the influence of pressure of the corrugated steel elements.

The tire produced by the simple juxtaposition of the elements described is possibly incapable of resisting strong pressure, especially if used for heavy vehicles and to overcome this objection an air chamber a completely traversing said elements may be used as shown in Fig. 2. The said air chamber may be in the form of a coil or tube closed at each end, said ends abutting when the chamber is introduced into the series of protecting elements; or it may be formed in the known manner of a continuous ring or tube. In this case it would be necessary for its introduction into the elements to split the latter on a generating line and to use steel collars the overlapping ends of which are connected by a screw and nut as in Fig. 4 or by other suitable means. The ends of the rubber or like collars would obviously be connected again by simple pressure.

The flexible metallic collars B which form the protection for the air chamber preferably overlap each other as shown in Figs. 2 and 5 to prevent access of foreign bodies which might pass through the outer elements or cover.

It is obvious that the cork or rubber elements are within such limits as regards bulk that they do not interfere with the restoring of the metallic parts to their normal shape.

What I claim and desire to secure by Letters Patent of the United States is:—

In a tire an elastic member comprising an outer part of elastic material externally smooth and having interior corrugations, an intermediate corrugated metallic resilient part whose corrugations engage those in the outer part, and an inner part of elastic material internally smooth and having exterior corrugations engaging those of the metallic part substantially as described.

In witness whereof I have signed this specification in the presence of two witnesses.

MATHIEU BRUN.

Witnesses:
   JEAN GERMAIN,
   HIPPOLYTE VILLELONGUE.